United States Patent
Leung et al.

(10) Patent No.: US 8,422,747 B1
(45) Date of Patent: Apr. 16, 2013

(54) FINDING UNTAGGED IMAGES OF A SOCIAL NETWORK MEMBER

(75) Inventors: Dominic King Hay Leung, Thornhill (CA); Kenneth Kwan, Scarborough (CA)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/448,332

(22) Filed: Apr. 16, 2012

(51) Int. Cl.
*G06K 9/00* (2006.01)

(52) U.S. Cl.
USPC .......................................................... 382/118

(58) Field of Classification Search ................... 382/118
See application file for complete search history.

(56) References Cited

U.S. PATENT DOCUMENTS

| | | | | |
|---|---|---|---|---|
| 7,298,931 B2 * | 11/2007 | Kim et al. | ..................... | 382/305 |
| 7,664,962 B2 * | 2/2010 | Kuhlman | ..................... | 713/186 |
| 2008/0080745 A1 * | 4/2008 | Vanhoucke et al. | .......... | 382/118 |
| 2010/0172550 A1 * | 7/2010 | Gilley et al. | ................... | 382/118 |
| 2011/0038512 A1 * | 2/2011 | Petrou et al. | ................... | 382/118 |
| 2012/0114199 A1 * | 5/2012 | Panyam et al. | ............... | 382/118 |

\* cited by examiner

*Primary Examiner* — Samir Ahmed
(74) *Attorney, Agent, or Firm* — IP Spring Corporation

(57) ABSTRACT

A method for enabling a new member of a social network to tag photos of the new member is described, where the photos have been previously uploaded by existing members before the new member joined the social network. For example, a system can obtain a reference image (e.g., a profile picture) of the new member. The system compares the reference image to stored images in the social network using facial recognition technology and generates a list of stored images in which the new member may be pictured. The system enables the new member to take one or more predefined actions with regard to each image in the list. For example, the predefined actions may include tagging an image in which the new member is pictured, or sending a notification to the owner of an image in the list.

14 Claims, 5 Drawing Sheets

FINDING UNTAGGED IMAGES OF A SOCIAL NETWORK MEMBER

FIELD

Embodiments relate generally to social networks, and, more particularly, to finding untagged images of a social network member.

BACKGROUND

Social networks often permit members to tag themselves or other members in photos (or images) that have been uploaded to the social network system. Tagging can include associating a word or phrase with content, such as a photo. A tag can include a name of, and link to, a member of the social network (e.g., the member who uploaded the photo and/or other members of the social network). The tags can be associated with corresponding member accounts in the social network. A person pictured in one or more photos uploaded to the social network may not have been a member of the social network at the time the photos were uploaded, and thus may not have been tagged in those photos. Later, when the person joins the network, there may be an opportunity for the person to tag himself/herself in the photos that were uploaded before the person joined the social network.

SUMMARY

One embodiment includes a method for finding untagged images of a new member of a social network system. The method can include comparing at least one reference image of a new member of a social network system to each one of a plurality of stored images in the social network system. The comparing can be performed using facial recognition software, for example.

The method can also include computing a metric corresponding to each stored image based on the comparing. The metric can represent a probability that the new member is pictured in the corresponding stored image. The method can further include generating a list of images, each image in the list having a corresponding metric that is greater than a threshold, and sending a message to the new member indicating that the comparing and the generating are complete, the message including a link to the list.

The method can also include causing the list to be displayed when the link is accessed by the new member, and enabling the new member to take one or more predefined actions with regard to each image in the list, where the predefined actions include applying a tag that associates an image with the new member and sending a notification to another member associated with an image.

Another embodiment includes a method for finding untagged images of a new member of a social network system (or an existing member that has opted in or requested that untagged images be found). The method can include comparing at least one reference image of a new member of a social network system to each stored image of a plurality of stored images in the social network system. The at least one reference image can be a profile picture of the new member of the social network system.

The method can also include generating a list of images based on the comparing, wherein each image in the list is likely to include an image of the new member. The method can further include enabling the new member to take one or more predefined actions with regard to each image in the list. The at least one reference image includes a plurality of reference images.

The predefined actions can include applying a tag that associates an image with the new member and/or sending a notification to another member associated with an image.

The method can also include computing a metric corresponding to each stored image based on the comparing. The metric can represent a probability that the new member is pictured in each corresponding stored image. Each image in the list can be selected for inclusion in the list based on that image having a corresponding metric greater than a threshold.

The method can also include sending a message to the new member of the social network system indicating that the comparing and the generating are complete, where the message includes a link to the list. The list can be displayed to the new member when the link is selected, or the list can be displayed automatically once the comparing and generating are complete.

The plurality of stored images being searched can be limited to a selected group of members of the social network system (e.g., friends, family or those closely linked to the new member).

Another embodiment can include a system having a processor coupled to a computer readable storage medium. Software instructions are stored in the computer readable medium. When the processor executes the software instructions, the processor performs operations.

The operations include comparing at least one reference image of a new member of a social network to each stored image of a plurality of stored images in the social network, and generating a list of images based on the comparing, wherein each image in the list is likely to include an image of the new member. The operations can also include enabling the new member to take one or more predefined actions with regard to each image in the list.

In the system, the predefined actions can include applying a tag that associates an image with the new member and/or sending a notification to another member associated with an image.

The at least one reference image can include a plurality of reference images. Having more than one reference image may improve recognition accuracy. The reference image can be a profile picture of the new member of the social network.

In the system, the operations can also include computing a metric corresponding to each stored image based on the comparing. The metric can represent a probability that the new member is pictured in each corresponding stored image. Each image in the list can have a corresponding metric greater than a threshold.

In the system, the operations can further include sending a message to the new member of the social network indicating that the comparing and the generating are complete, the message including a link to the list. The system can cause the list to be displayed. The plurality of stored images can be taken from a selected group of members of the social network system.

The operations further include repetitively performing the comparing and the generating according to a schedule. The repetitive comparing and generating can be limited to a group of stored images including one or more of: 1) images uploaded by members connected to the new member, 2) images associated with a location close to a location of the new member, and/or 3) images from an event the new member has attended.

DETAILED DESCRIPTION

Embodiments described herein provide a method for enabling a new member of a social network to tag photos of the same new member, where the photos have been previously uploaded by existing members before the new member joined the social network. In one embodiment, a system obtains a reference image such as a profile picture of the new member. The system then compares the reference image to stored images in the social network using facial recognition technology, and generates a list of stored images in which the new member may be pictured.

For example, a user joins a social network that includes some of the user's existing friends who have uploaded images that include the user, prior to the user joining the social network. The embodiments described herein enable the user to upload a profile picture and generate a list of images having a probability above a threshold of including the user.

The system enables the new member to take one or more predefined actions with each image in the list. The predefined actions may include tagging an image in which the new member is pictured. For example, the new member may apply a tag to each image, where the tag is the new member's name and includes a link to the new member's profile page. The predefined actions may also include sending a notification to the owner of an image in the list (e.g., to ask that an image be removed from the social network system).

In one embodiment, the system computes a metric corresponding to each stored image. The metric may be based on the comparing step and may represent a probability that the new member is pictured in the corresponding stored image. In one embodiment, each photo in the list has a corresponding metric that is greater than a threshold.

The comparing may take a long time because of the number of stored images. In various embodiments, the member need not wait for the system to complete the comparing step, because the system can perform the comparing step as a background operation and later send a message to the member indicating that the list is complete. In one embodiment, the message may include a link to the list. To help limit the amount of stored images to be searched, the stored images can be limited to a subset of images. For example, when the user joins the social network, the user can specify that the subset of images should be limited to only the user's friends in the social network.

Figure 1:
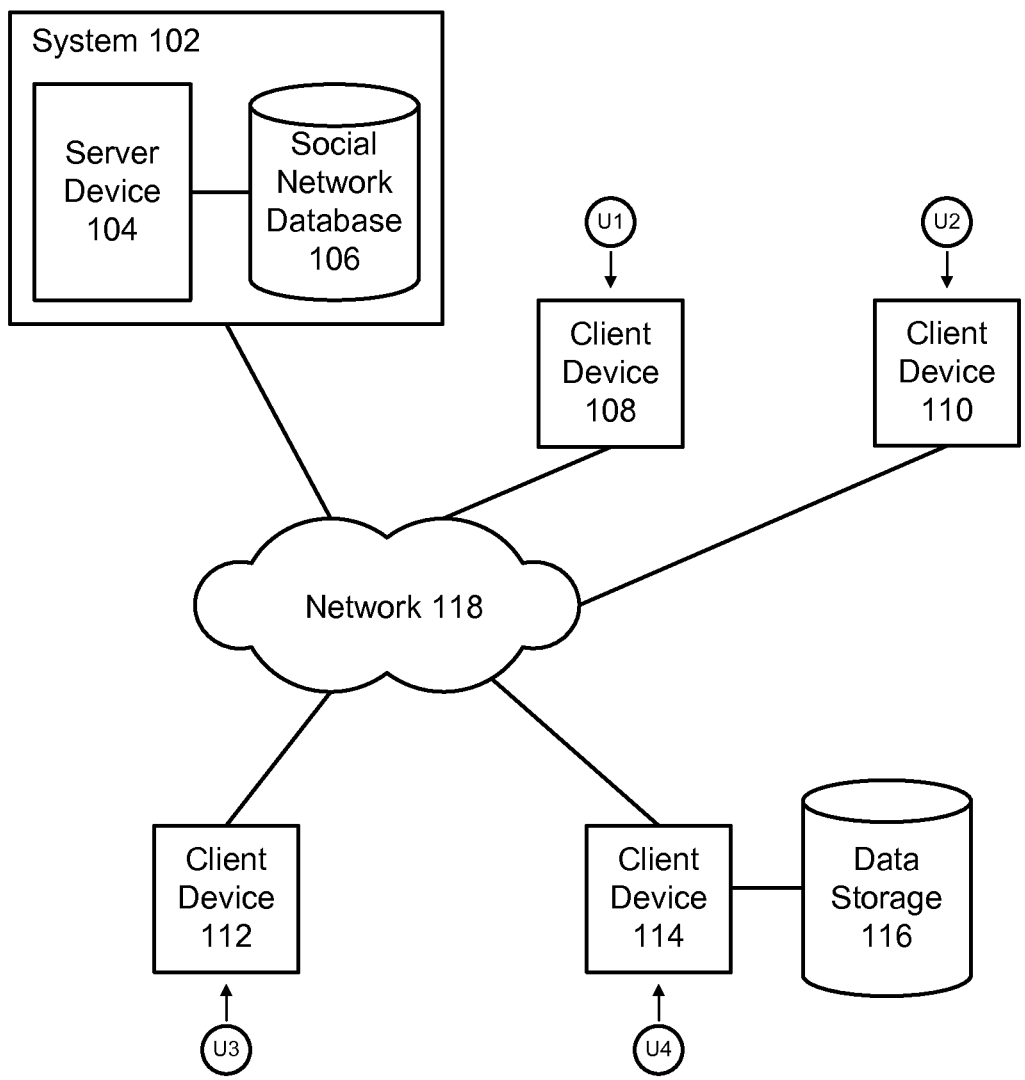
FIG. 1 is a diagram of an example social network system in accordance with at least one embodiment.

As shown in FIG. 1, a social network environment 100 includes a social network system 102 having a server device 104 and a social network database 106. One or more client devices (108-114) can access the social network system 102 via a network 118. A client device 114 can have a data storage device 116 attached.

In operation, a plurality of users (U1-U4) can access the social network system 102 via respective client devices (108-114). Users can upload images (e.g., photographs) to the social network system 102. The images can be stored in the social network database 106.

The social network system 102 can permit users to tag images (e.g., associate a word or phrase with an image). A tag can include a name of, and link to, a member of the social network (e.g., the member who uploaded the photo and/or other members of the social network). A member tag may not be available for people pictured in an image that do not belong to the social network.

When a new member joins the social network, there may be images stored in the social network database 106 that were uploaded before the new member joined and which have not been tagged as having the new member pictured in the images. It may be time consuming or difficult for the new member to search and tag stored images for those that he/she may be pictured in. An embodiment includes automatically searching for the new member in stored images and permitting the new member to tag himself/herself in the stored images that are likely to include the new member in the photos (e.g., have a certain probability of containing an image of the new member).

As used herein, the term "new member" encompasses its plain and ordinary meaning, including but not limited to a member that has recently joined a social network. Additionally, the term "new member" can also refer to an existing member of the social network who opts-in (or otherwise indicates a desire) to find untagged photos of himself or herself.

The system can provide existing members of the social network with a selectable option for allowing or disallowing uploaded photos to be searched. For example, a member can select an option that does not make the member's photos available for searching for untagged photos. Then, when the system is searching uploaded photos, the system will not search those photos belonging to a member who has opted out of making photos available for searching. Alternatively, the option for making uploaded photos available for searching can limit the availability to only those searches associated with another member that is a friend or is directly connected to the member, or to one or more searches for which the member has given the system explicit permission to search uploaded photos.

An existing member or a new member can opt-in or opt-out of having the system search for untagged photos. For example, when a new member joins, the new member can be given the option of providing a reference image and having the system search for untagged photos, or an option of not providing a reference image and having the system skip the search for untagged photos. In general, the system can use the options and selections described above to protect the privacy of a member that does not want to make uploaded photos available for search and/or does not want to have the system search for untagged photos of the member.

Figure 2:
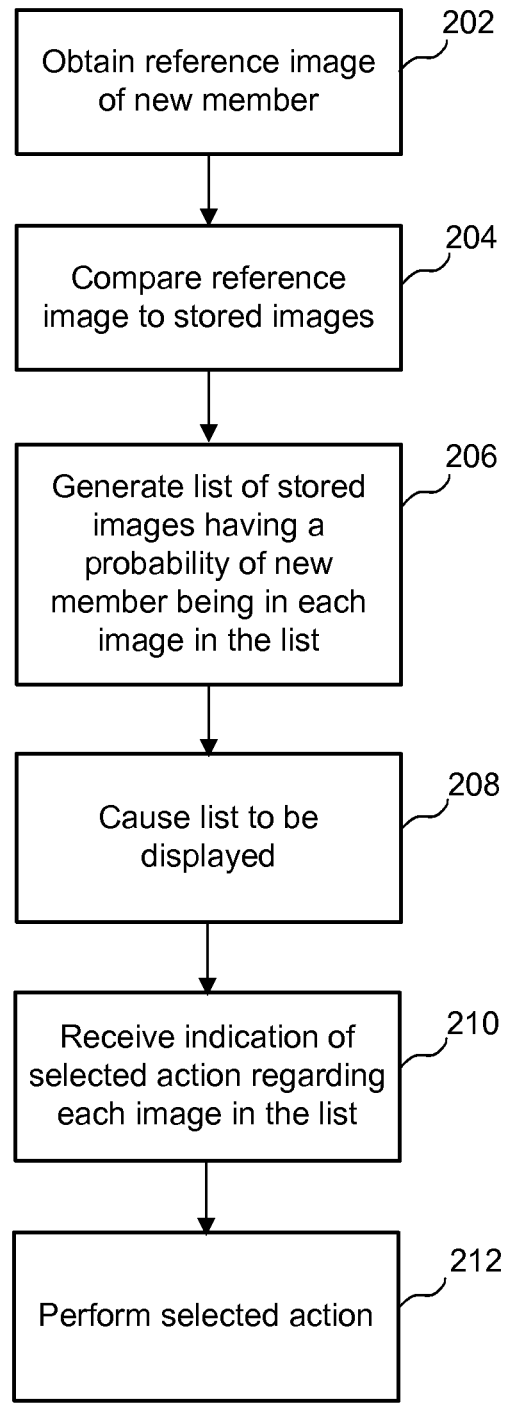
FIG. 2 is a flow chart of an example method for finding untagged images in a social network system in accordance with at least one embodiment.

For example, FIG. 2 shows an example method for finding untagged images in a social network system. Processing begins at 202 where the system obtains one or more reference images of a new member. For example, the reference image can be a profile image that the new member has uploaded. Also, a group of images can be provided and the reference image can be based on a composite of the group of images; or each image of the group can be used as a reference. The reference image can include an image of the face of the new member. Processing continues to 204.

At 204, the system compares the reference image to one or more stored images. The comparison can be performed by a facial recognition system. The facial recognition system can use the reference image and one or more stored images as input, and can seek to identify any possible occurrence of an image similar to the reference image in the stored images.

The facial recognition software can include, but is not limited to, algorithms that identify faces by extracting features from a reference image of the new member's face. For example, a facial recognition algorithm may analyze the relative position, size, and/or shape of facial features such as eyes, nose, mouth, cheekbones, and jaw. Data gathered from the analysis can then be used to search for other images with matching, or similar, features. Other facial recognition systems can normalize a plurality of reference images and compress the face data into a composite representation having information that is useful for face detection.

Facial recognition systems can include two main groups, geometric systems, which are based on feature discrimination, and photometric systems, which are based on a statistical approach that distills a reference image into values and compares those values with stored images. A combination of the geometric and photometric approaches could also be used.

Facial recognition systems may be based on one or more techniques such as principal component analysis, linear discriminate analysis, elastic bunch graph matching, hidden Markov models, and dynamic link matching. It will be appreciated that other now known or later developed facial recognition systems and/or techniques could be used.

The facial recognition system may generate an output indicating a likelihood (or probability) that the member pictured in the reference image is pictured in a stored image. The output may be represented as a metric (or numerical value) such as a percentage associated with the confidence that the subject of the reference image is contained in a corresponding stored image. For example, a value of 1.0 may represent 100% confidence that the member is pictured in the stored image. This could occur, for example when the reference image is identical or nearly identical to a stored image. The value could be lower, for example 0.5 when there is a 50% chance that the member pictured in the reference image is also pictured in the stored image. An output of the facial recognition software could be a confidence score for matching or other suitable output. In general, any method and/or output indicating a likelihood that the person in a reference image is shown in a stored image could be used. Processing continues to 206.

At 206, the system generates a list of stored images likely (e.g., having a probability above a certain threshold) to contain the new member shown in the reference image. For example, the system may take the output results from the facial recognition software and filter those results to only include stored images having a metric corresponding to a probability above a certain threshold (e.g., above 80%). Processing continues to 208.

At 208, the system can cause the list to be displayed. For example, the system can cause the list to be displayed in a graphical user interface (e.g., see, FIG. 3 below) of a client device. Processing continues to 210.

Figure 3:
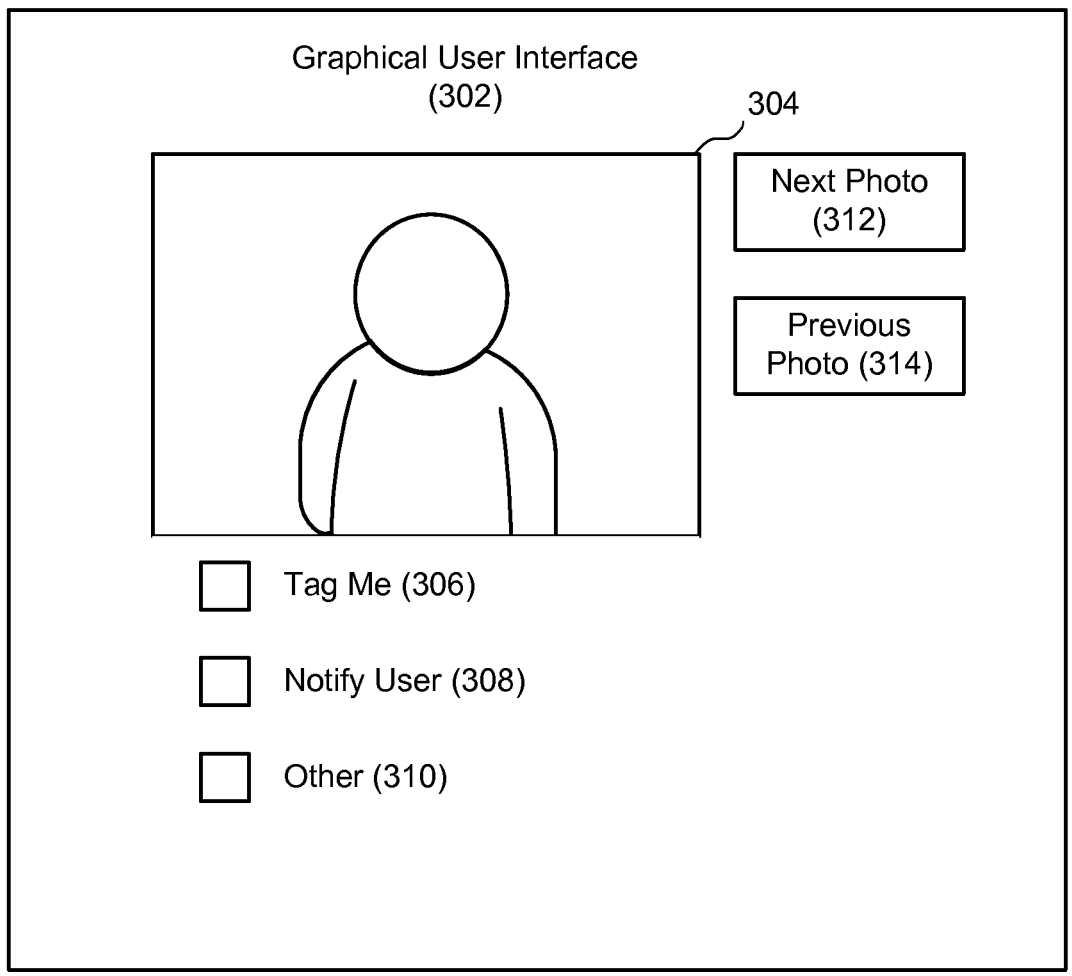
FIG. 3 is an example graphical user interface in accordance with at least one embodiment.

At 210, the system receives an indication of an action the member would like to take regarding each picture. For example, as shown in FIG. 3, the member can tag the image, notify the user who uploaded the image, or take another action. Also, the member could simply do nothing regarding an image (e.g., if the member is not pictured in the image). Processing continues to 212.

At 212, the system performs the action selected, if any, for each image in the list. It will be appreciated that 202-212 can be repeated in whole or in part in order to accomplish a contemplated task.

FIG. 3 is an example graphical user interface (GUI) 302 having an image section 304, a "Tag Me" action selection element 306, a "Notify User" action selection element 308 and an "Other" action selection element 310. The GUI 302 also includes a "Next Photo" control 312 and a "Previous Photo" control 314, which can be buttons, for example.

In operation, the GUI 302 can display an image (e.g., from the list of stored images generated as described above) in the image section 304. The GUI 302 can accept user input for an action to be taken with regard to the image shown in the image section 304. For example, checkbox elements can be provided for 306-310 and the GUI 302 can receive input from the user via the checked boxes regarding actions to be taken.

A user can advance to a next picture in the list by selecting the Next Photo button 312, or go back to a previous image by selecting the Previous Photo button 314.

The action checkbox Other 310 can include other actions in addition to, or as an alternative to tagging or notifying.

Figure 4:
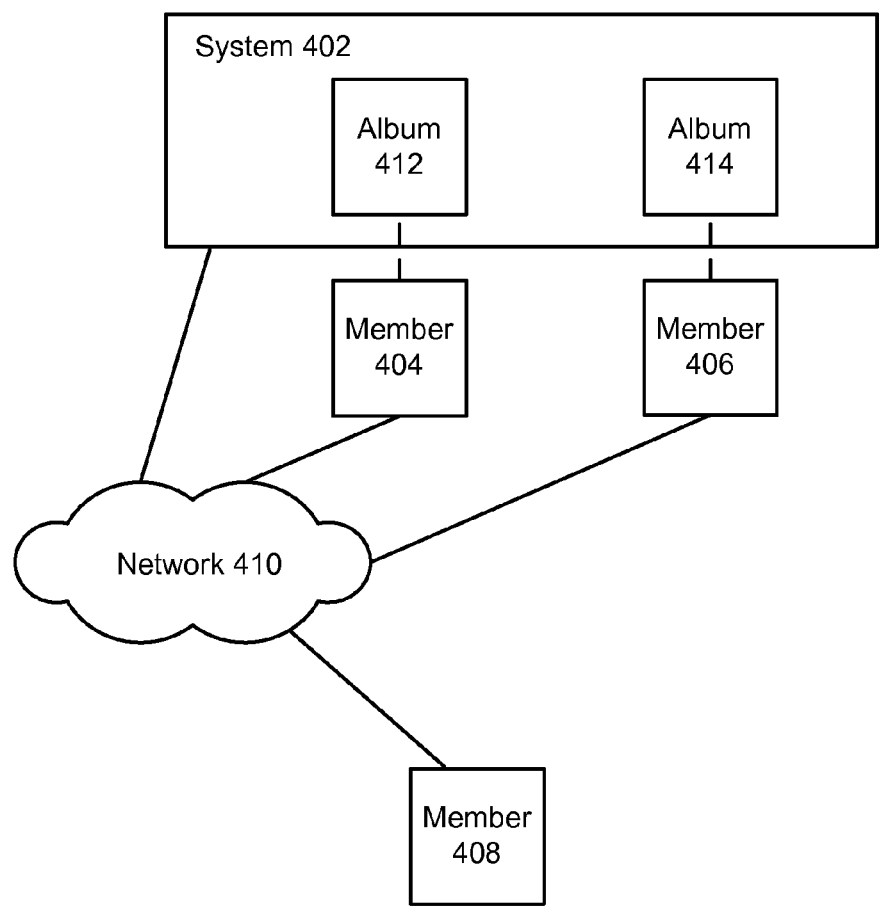
FIG. 4 is a diagram of an example social network system in accordance with at least one embodiment.

As shown in FIG. 4, an example social network environment includes a social network system 402. The social network can include existing members (404 and 406) and a new member 408. The members (404-408) can connect to the social network system via a network 410. The social network system can include photo albums 412 and 414 of uploaded images from members 404 and 406, respectively.

The new member 408 may be a friend of the other two members 404 and 406, and may be pictured in the images stored in the photo albums 412 and 414.

The social network system 402 could find untagged photos picturing the new member 408 in the photo albums 412 and 414 according to the method described above. Because a social network system can contain many users and uploaded images, the system could limit the amount of stored images to search to a group of members. For example, if member 404 and member 406 are the only friends in the social network system linked to new member 408, the system may search only the photo albums (412 and 414) belonging to those members (404 and 406).

As the new member 408 adds friends and those friends are confirmed, the system could update the finding of untagged photos to include searching the albums of any friends added since the last time the system search for untagged photos of the new member.

Figure 5:
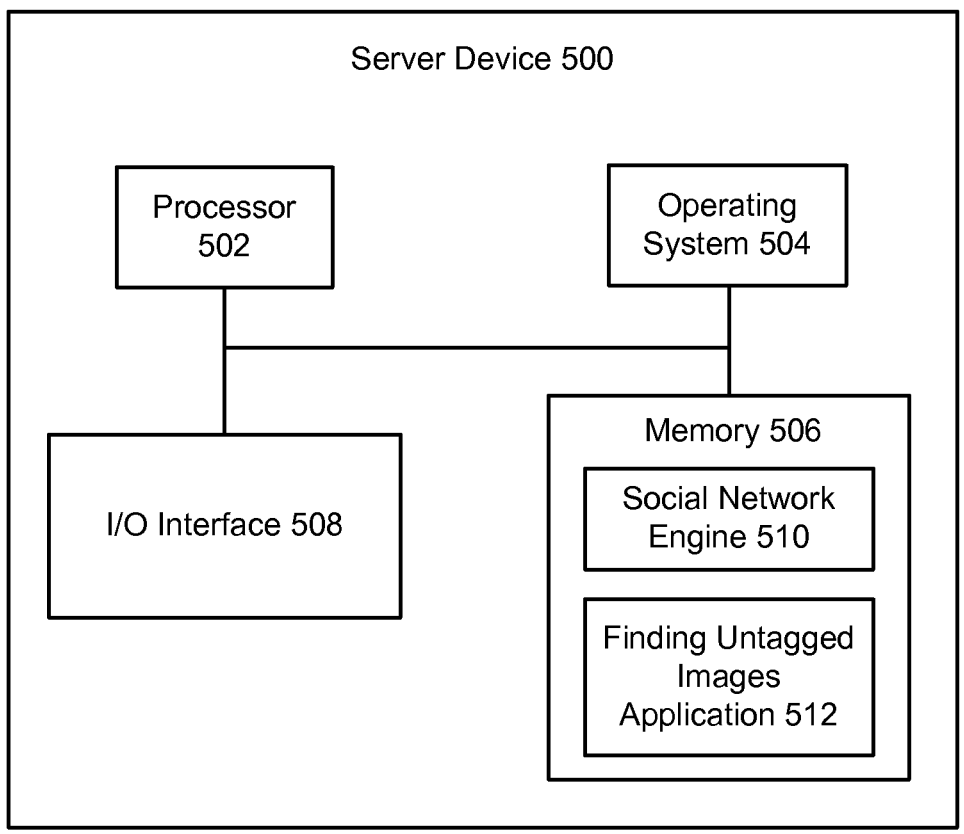
FIG. 5 is a diagram of an example server system in accordance with at least one embodiment.

FIG. 5 is a diagram of an example server device 500 that can be used to find untagged photos in a social network system in accordance with at least one embodiment. The server device 500 includes a processor 502, operating system 504, memory 506 and I/O interface 508. The memory 506 can include a social network engine 510 and an application program for finding untagged images 512.

In operation, the processor 502 may execute the application 512 stored in the memory 506. The application 512 can include software instructions that, when executed by the processor, cause the processor to perform operations for finding untagged images in accordance with the present disclosure (e.g., performing one or more of steps 202-212 described above).

The application program 512 can operate in conjunction with the social network engine 510 and the operating system 504.

In another embodiment, an existing member, upon learning that the new member has joined the social network, can request that the images uploaded by the existing member be searched for untagged images of the new member. The existing member can provide a reference image from the new member (e.g., profile picture) or the existing member can use an image of the new member from among the images that the existing member has previously uploaded to the social network system.

In another embodiment, an existing member of the social network system may want to see any untagged photos that may contain an image of him or herself. The existing member can opt-in, or select, to have the finding untagged images application 512 execute using a reference image of the existing member. This way, the existing member can learn of any untagged photos that may contain an image of the existing member and can take an action, as described above, with regard to those images.

Also, the searching for untagged images function, "Tag Me" action selection element 306, can be performed on a regular basis (e.g., daily, weekly, monthly or the like) or in response to an action (e.g., attending an event, adding a new friend or the like).

In order to limit the number of stored images that are searched when repeating the process for finding untagged images, the system 402 can skip previously searched images. Also, the system 402 can limit the number of images searched by searching only a group of images such as those images from friends of the member in the reference image, those images associated with a geographic location close to a location associated with the member in the reference image, those images associated with friends or other members in the social network close (in terms of degrees of separation) to the member pictured in the reference image, and images from an event the member has attended.

The server (e.g., 104 and/or 500) can include, but is not limited to, a single processor system, a multi-processor system (co-located or distributed), a cloud computing system, or a combination of the above.

The client device can include, but is not limited to, a desktop computer, a laptop computer, a portable computer, a tablet computing device, a smartphone, a feature phone, a personal digital assistant, a media player, an electronic book reader, an entertainment system of a vehicle or the like.

The network can be a wired or wireless network, and can include, but is not limited to, a WiFi network, a local area network, a wide area network, the Internet, or a combination of the above.

The data storage, memory and/or computer readable medium can be a magnetic storage device (hard disk drive or the like), optical storage device (CD, DVD or the like), electronic storage device (RAM, ROM, flash, or the like). The software instructions can also be contained in, and provided as, an electronic signal.

Moreover, embodiments of the disclosed method, system, and computer readable media can be implemented in software executed on a programmed general purpose computer, a special purpose computer, a microprocessor, or the like.

It is, therefore, apparent that there is provided, in accordance with the various embodiments disclosed herein, systems, methods and computer readable media for finding untagged images of a new member of a social network.

While the invention has been described in conjunction with a number of embodiments, it is evident that many alternatives, modifications and variations would be or are apparent to those of ordinary skill in the applicable arts. Accordingly, Applicants intend to embrace all such alternatives, modifications, equivalents and variations that are within the spirit and scope of the invention.

What is claimed is:

1. A method comprising:
    comparing at least one reference image of a new member of a social network system to each one of a plurality of stored images in the social network system;
    computing a metric corresponding to each stored image based on the comparing, the metric representing a probability that the new member is pictured in the corresponding stored image;
    generating a list of images of the new member, wherein the generating includes identifying each stored image determined to contain an image of the new member based on a corresponding metric, each image in the list of images of the new member having a probability, above a threshold, of containing an image of the new member;
    sending a message to the new member indicating that the comparing and the generating are complete, the message including a link to the list of images of the new member;
    causing each image in the list of images of the new member to be displayed individually when the link is accessed by the new member; and
    enabling the new member to take one or more predefined actions individually with regard to each image in the list of images of the new member, wherein the predefined actions include applying a tag that associates an image with the new member and sending a notification to another member associated with an image.

2. A method comprising:
    comparing at least one reference image of a new member of a social network system to each stored image of a plurality of stored images in the social network system;
    computing a metric corresponding to each stored image based on the comparing, wherein the metric represents a probability that the new member is pictured in each corresponding stored image;
    generating a list of images of the new member based on the comparing, wherein the generating includes identifying each stored image determined to contain an image of the new member based on a corresponding metric, wherein each image in the list of images of the new member has a probability above a threshold of including an image of the new member; and
    enabling the new member to take one or more predefined actions individually with regard to each image of the new member in the list of images of the new member, wherein the predefined actions include applying a tag that associates an image with the new member and sending a notification to another member associated with an image.

3. The method of claim 2, wherein the at least one reference image includes a plurality of reference images.

4. The method of claim 2, wherein the at least one reference image is a profile picture of the new member of the social network system.

5. The method of claim 2, further comprising sending a message to the new member of the social network system indicating that the comparing and the generating are complete, the message including a link to the list of images of the new member.

6. The method of claim 2, further comprising causing the list of images of the new member to be displayed.

7. The method of claim 2, wherein the plurality of stored images are taken from a selected group of members of the social network system.

8. A system comprising:
    a processor coupled to a computer readable storage medium, the computer readable storage medium having stored therein software instructions that, when executed by the processor, cause the processor to perform operations including:

comparing at least one reference image of a new member of a social network to each stored image of a plurality of stored images in the social network;

computing a metric corresponding to each stored image based on the comparing, wherein the metric represents a probability that the new member is pictured in each corresponding stored image;

generating a list of images of the new member based on the comparing, wherein the generating includes identifying each stored image determined to contain an image of the new member based on a corresponding metric, wherein each image in the list of images of the new member has a probability above a threshold of including an image of the new member; and enabling the new member to take one or more predefined actions individually with regard to each image of the new member in the list of images of the new member, wherein the predefined actions include applying a tag that associates an image with the new member and sending a notification to another member associated with an image.

9. The system of claim 8, wherein the at least one reference image includes a plurality of reference images.

10. The system of claim 8, wherein the at least one reference image is a profile picture of the new member of the social network.

11. The system of claim 8, wherein the operations further include sending a message to the new member of the social network indicating that the comparing and the generating are complete, the message including a link to the list of images of the new member.

12. The system of claim 8, wherein the operations further include causing the list of images of the new member to be displayed.

13. The system of claim 8, wherein the plurality of stored images are taken from a selected group of members of the social network.

14. The system of claim 8, wherein the new member includes a member for which an opt-in has been received.

* * * * *